(12) United States Patent
Dean et al.

(10) Patent No.: US 11,530,085 B2
(45) Date of Patent: Dec. 20, 2022

(54) THERMAL SLEEVE FOR MANIPULATING HEAT TRANSFER

(71) Applicants: Alice Dean, Dallas, TX (US); Elizabeth Paige McCoy, Dallas, TX (US)

(72) Inventors: Alice Dean, Dallas, TX (US); Elizabeth Paige McCoy, Dallas, TX (US)

(73) Assignees: Alice Dean, Dallas, TX (US); Elizabeth Paige McCoy, Dallas, TX (US)

( * ) Notice: Subject to any disclaimer, the term of this patent is extended or adjusted under 35 U.S.C. 154(b) by 90 days.

(21) Appl. No.: 16/655,708

(22) Filed: Oct. 17, 2019

(65) Prior Publication Data

US 2021/0114794 A1    Apr. 22, 2021

(51) Int. Cl.
*B65D 81/38* (2006.01)
*B65D 85/72* (2006.01)

(52) U.S. Cl.
CPC ..... *B65D 81/3874* (2013.01); *B65D 81/3869* (2013.01); *B65D 85/72* (2013.01)

(58) Field of Classification Search
CPC ............ B65D 81/3874; B65D 81/3869; B65D 81/3881; B65D 81/3886; F25D 3/08
See application file for complete search history.

(56) References Cited

U.S. PATENT DOCUMENTS

| | | | | |
|---|---|---|---|---|
| 4,383,422 A | * | 5/1983 | Gordon | B65D 81/3886 215/13.1 |
| 5,398,842 A | * | 3/1995 | Sokolski | A47G 19/2272 220/367.1 |
| 2011/0108613 A1 | * | 5/2011 | Stribling | B65D 77/28 229/103.1 |
| 2011/0114648 A1 | * | 5/2011 | Proskey | F25D 3/08 220/592.17 |

* cited by examiner

*Primary Examiner* — Jeffrey R Allen
(74) *Attorney, Agent, or Firm* — Baker Botts, LLP (57) ABSTRACT

A system for manipulating heat transfer includes a thermal sleeve, a vessel and a lid. The thermal sleeve includes a first material and a second material. The vessel includes an outer wall disposed about an inner wall, the inner wall defining a reservoir configured to contain a liquid and the inner wall and outer wall defining a gap therebetween. The lid is configured to open to facilitate adding of the liquid to the reservoir. The thermal sleeve is configured to be positioned within the gap.

20 Claims, 3 Drawing Sheets

THERMAL SLEEVE FOR MANIPULATING HEAT TRANSFER

TECHNICAL FIELD

This disclosure generally relates to heating and cooling liquids and, more specifically, to a system for manipulating heat transfer.

BACKGROUND

People expect certain foods and beverages to be served and/or ingested at particular temperatures. Therefore, heating or cooling solutions have been developed which alter the temperature of food and beverages. For example, the temperature of foods and beverages can be increased by applying heat via fire, conventional ovens, and microwave ovens. Conversely, the temperature of foods and beverages can be decreased by applying cooling via, for example, ice, refrigerators, and reusable "icepacks." Solutions have also been developed to address the related issue of maintaining a food and/or beverage at a desirable temperature. Ice chests, thermoses, and polystyrene containers are particular examples of such solutions.

SUMMARY OF THE DISCLOSURE

According to one embodiment, a system for manipulating heat transfer includes a thermal sleeve, a vessel, and a covering. The thermal sleeve includes a paraffin wax layer adjacent a copper layer. The vessel includes an outer wall disposed about the inner wall, wherein: the inner wall defines a reservoir configured to contain the liquid; and the inner wall and the outer wall define a gap therebetween that is sized to accommodate the thermal sleeve. The lid includes an aperture sized to accommodate a straw therethrough. The lid is configured to couple to a top portion of the vessel and is further configured to open to facilitate adding the liquid to the reservoir. The covering is configured to couple to a bottom portion of the vessel and is further configured to open to facilitate removal of the thermal sleeve from the gap. The thermal sleeve is further configured to exchange heat with the liquid when installed within the gap.

According to another embodiment, a system for manipulating heat transfer includes a thermal sleeve, a vessel, and a lid. The thermal sleeve includes a first material and a second material. The vessel includes an outer wall disposed about an inner wall, wherein: the inner wall defines a reservoir configured to contain a liquid; and the inner and the outer wall define a gap therebetween. The lid is configured to open to facilitate filling of the reservoir with the liquid. The thermal sleeve is configured to exchange heat with the liquid and is further configured to be positioned within the gap.

In still another embodiment of the current invention, there is disclosed a thermal sleeve. The thermal sleeve includes at least a first layer and a second layer. The first layer is adjacent to the second layer. The first layer includes a first material and the second layer includes a second material. The thermal sleeve has a size and shape configured to fit within a gap of a vessel, the gap being defined by an inner wall and an outer wall of the vessel. When installed within the gap of the vessel, the first layer of the thermal sleeve contacts the inner wall of the vessel.

The teachings of the disclosure provide one or more technical advantages or improvements. Embodiments of the disclosure may have none, some, or all these advantages or improvements. One such advantage provided by one or more embodiments disclosed herein is an increase in the rate of heat transfer relative to conventional insulated containers, between a vessel and the matter contained within the vessel (e.g., food or beverage). A benefit of the increased rate of heat transfer is a reduction in the time it takes to heat or cool the contents of a vessel to a desirable temperature, thereby potentially saving appreciable amounts of time when viewed in the aggregate of a lifetime of heating and cooling liquids in insulated containers. One might want to increase the rate of heat transfer, for example, when the contents of the vessel are too hot or cold to be consumed at a particular time and waiting for the contents to cool or heat, respectively, is not an option. Another advantage provided by one or more embodiments of the present disclosure operator is the ability to selectively regulate heat transfer. For example, removing a thermal sleeve from a vessel may slow the rate of heat transfer. One might want to slow the rate of heat transfer, for example, when the food or beverage contained within the vessel is already at its desired consumption temperature.

Other objects, features, and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

A number of solutions exist for heating and cooling foods and beverages to desirable consumption temperatures (e.g., applying heating and/or cooling elements to food and/or beverage). Once sufficiently heated or cooled, food and/or beverage may be transferred to a container or other receptacle configured to maintain the temperature of the food and/or beverage at or near the temperature at which it was initially transferred. Such containers/receptacles are referred to herein as insulation solutions. Generally, insulation solutions are constructed to insulate the contents of a container so as to reduce the rate of heat transfer between the container contents and the environment surrounding the container (also referred to herein as "surrounding medium"). One popular example of an insulation solution is a thermos. Another example of an insulating solution is a neoprene can cooler, also referred to as a "koozie."

One drawback of conventional insulation solutions is the inability to selectively regulate the temperature of the contents within such insulation solution without the assistance of one or more heating or cooling elements (e.g., microwave, stovetop, ice packs, refrigerator). As an example, one might want to adjust the temperature of a food or beverage in a thermos because the food or beverage is too hot or too cold to be consumed. One solution to increasing the rate of heat transfer (such that the food or beverage cools or warms to a desired temperature) is to open the lid of the thermos and wait until the food or beverage reaches a desired temperature. Although effective, this method may be impractical in certain situations. One specific example may be that one may be pressed for time such that (s)he does not have enough time to wait for his/her food or beverage to reach a desired temperature and to subsequently consume the food or beverage within an allotted time frame of a work break.

The present disclosure describes and illustrates a system and method for manipulating heat transfer that overcomes one or more shortcomings of conventional heating and/or cooling solutions. In particular, the present disclosure describes a system and method that utilizes at least one thermal sleeve to facilitate heat transfer between the contents of a food or beverage in a container and the surrounding environment. This disclosure specifically contemplates changing the thermal conductivity of the container by installing the thermal sleeve within the container. As appreciated herein, the thermal sleeve may change, when installed within the container, the thermal conductivity of the container because the thermal sleeve has a greater thermal conductivity than the matter (e.g., air) that the thermal sleeve replaces when installed within the container. This disclosure contemplates thermal sleeve being removably installed within the container such that an operator may selectively control the rate of heat transfer.

As will be described in more detail below, the thermal sleeve may comprise certain materials having properties that facilitate heat transfer. For example, thermal sleeve may comprise at least one material that operates as a thermal conductor and another material that operates as a thermal absorber. As used herein, a thermal conductor refers to a material that allows energy in the form of heat to be transferred to another material without any movement of the material itself. The ability of a material to conduct heat can be quantified and is commonly referred to as "thermal conductivity." Thermal conductivity refers to the amount of heat that flows per unit time through a unit area with a temperature gradient of one degree per unit distance. Generally, a material with a high thermal conductivity is a more effective thermal conductor than a material with a lower thermal conductivity. As an example, copper is a more effective thermal conductor than lead because copper has a greater thermal conductivity than lead (the thermal conductivity of copper is approximately 413 W/m K and the thermal conductivity of lead is approximately 34.7 W/m K).

"Thermal absorber," as used herein, refers to a material configured to absorb heat that is transferred from another material. The ability of a material to absorb heat can be quantified and is commonly referred to as "specific heat capacity." Specific heat capacity refers to the amount of heat to be supplied to a given mass of a material to produce a unit change in its temperature. Generally, a material with a high specific heat capacity is a more effective thermal absorber than a material with a lower specific heat capacity. As an example, paraffin wax is a more effective thermal absorber than wool because paraffin wax has a greater specific heat capacity than wool (the specific heat capacity of paraffin wax is approximately 2.9 J $g^{-1}$ $K^{-1}$ and the specific heat capacity of wool is approximately 1.3 J $g^{-1}$ $K^{-1}$). As will be described in further detail below, the material composition of the thermal sleeve may be selected to efficiently manipulate heat transfer. Accordingly, in a preferred embodiment, the materials selected to comprise the thermal sleeve may be particularly effective heat conductors (e.g., having a thermal conductivity greater than approximately 200 W/m K) and particularly effective heat absorbers (e.g., having a specific heat capacity greater than approximately 2.0 J $g^{-1}$ $K^{-1}$).

Embodiments of the present disclosure and its advantages are best understood by referring to FIGS. 1-4, like numerals being used for like and corresponding parts of the various drawings.

Figure 1:
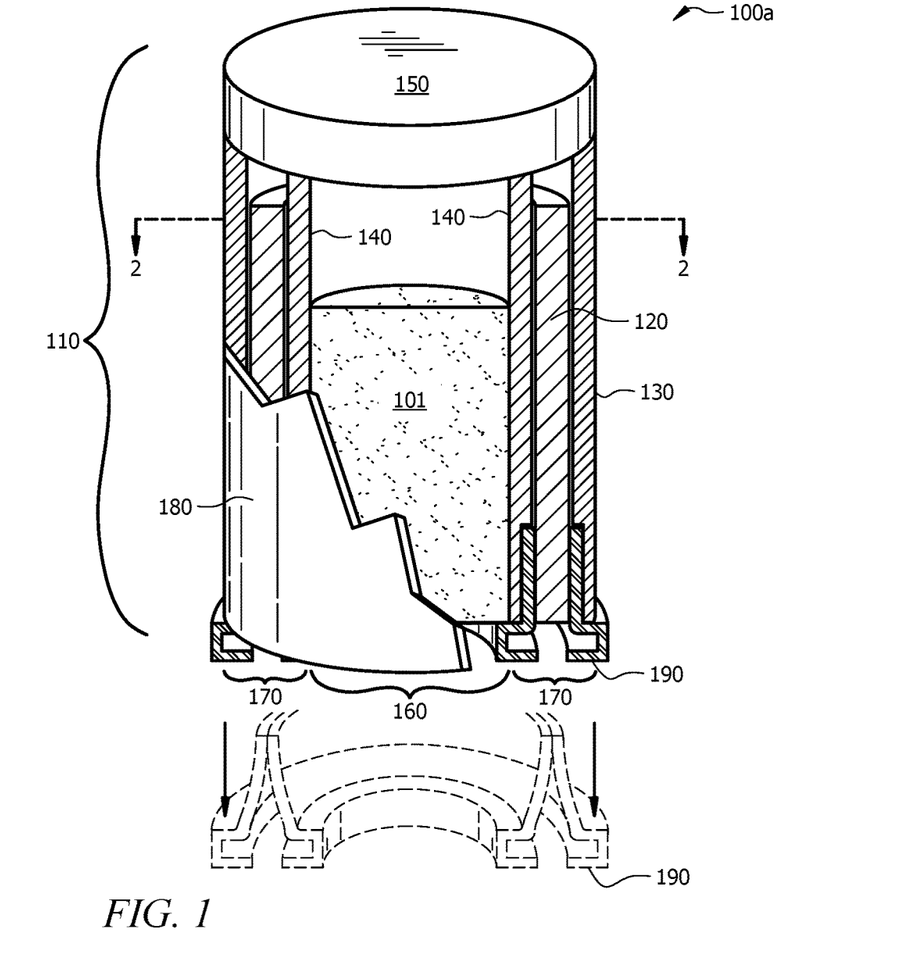
FIG. 1 illustrates a system for manipulating heat transfer, according to one embodiment of the present disclosure.

FIG. 1 illustrates one embodiment of a system 100 for manipulating heat transfer. In some embodiments, such as that depicted in FIG. 1, system 100 includes a vessel 110, a lid 150, and a thermal sleeve 120. Thermal sleeve 120 may be configured to be removably installed within vessel 110.

Figure 2:
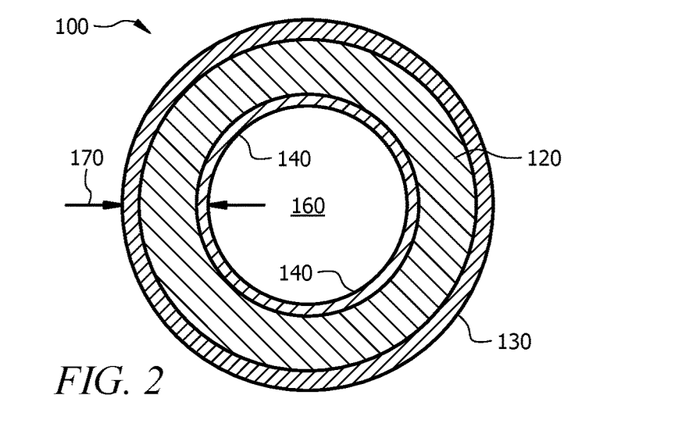
FIG. 2 illustrates a top-down view the system of FIG. 1, according to certain embodiments of the present disclosure.

Vessel 110 generally includes an inner wall 140, and an outer wall 130. Inner wall 140 defines a reservoir 160 configured to contain a liquid (or food) 101 and outer wall 130 is disposed about inner wall 140. Inner wall 140 and outer wall 130 are positioned within vessel 110 such that a gap 170 exists between them. The sizing of gap 170 may vary depending on the spacing between inner wall 140 and outer wall 130. In some embodiments, sizing of gap 170 is selected based on the thickness of thermal sleeve 120. For example, gap 170 may be sized to accommodate thermal sleeve 120. In some embodiments, this results in thermal sleeve 120 fitting snugly within gap 170. One of ordinary skill in the art will recognize certain benefits arising from snugly fitting thermal sleeve 120 within gap 170 (e.g., more effective heat transfer). Although FIG. 1 and FIG. 2 depict thermal sleeve 120 as filling substantially all the space between outer wall 130 and inner wall 140 (i.e., gap 170), this disclosure contemplates other embodiments where there is excess space between thermal sleeve 120 and either or both of outer wall 130 and inner wall 140.

Figure 4:
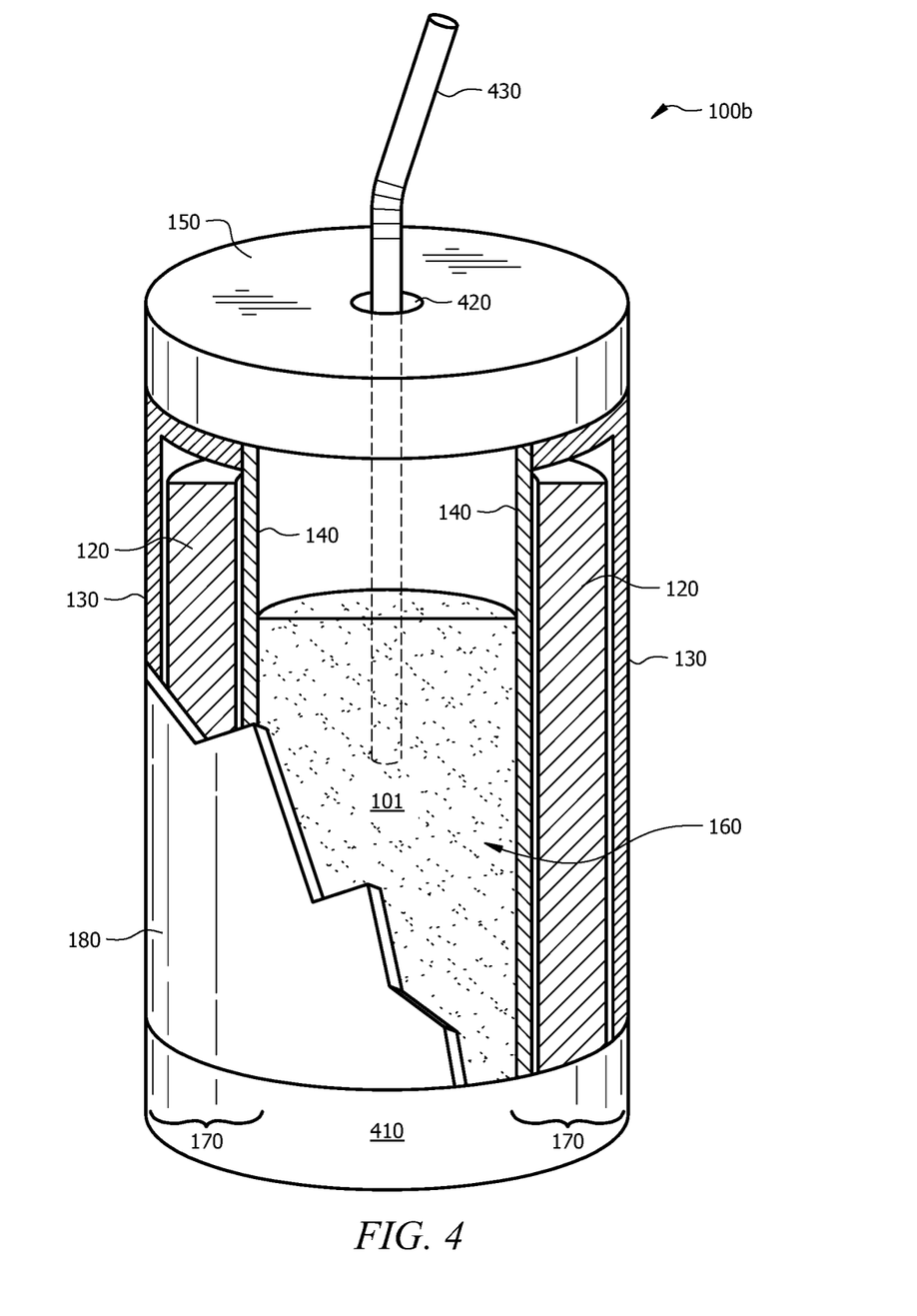
FIG. 4 illustrates another embodiment of a system for manipulating heat transfer, according to certain embodiments of the present disclosure.

In some embodiments, such as that depicted in FIG. 1, gap 170 is accessible upon removal of lid 150. In other embodiments, such as that depicted in FIG. 4, gap 170 is accessible upon removal of base 410. Access to gap 170 may be limited by one or more walls of vessel 110. For example, as shown in FIG. 4, outer wall 130 extends proximally towards inner wall 140 such that gap 170 cannot be accessed by removing lid 150. This disclosure contemplates numerous embodiments wherein walls of vessel 110 do, or do not, connect such that gap 170 is accessible, or inaccessible, respectively, by removing lid 150 and/or base 410. For example, this disclosure contemplates embodiments walls do not connect inner wall 140 and outer wall 130 such that gap may be accessed after removing either lid 150 or base 410. As another example, this disclosure contemplates embodiments wherein vessel 110 includes an additional wall connecting inner wall 140 and outer wall 130 (or extensions of either wall 130, 140) at the top or bottom of vessel 110 such that gap 170 is only accessible via the top or the bottom (see e.g., FIGS. 1 and 4). This disclosure recognizes that gap 170 may be used by an operator of system 100 as an additional reservoir for containing food or beverage 101 when thermal sleeve 120 is not installed within gap 170.

As described above, system 100 further includes lid 150. Lid 150 is a wholly or semi-removable covering of vessel 110 that provides access therethrough to at least reservoir 160. As depicted in FIG. 1, lid 150 of system 100a provides access therethrough to reservoir 160 and gap 120. Comparatively, lid 150 of system 100b (see FIG. 4) only provides access therethrough to reservoir 160. To add or remove liquid 101 from reservoir 160, full or partial removal of lid 150 is required.

FIG. 1 illustrates lid 150 as a screw-on cap to vessel 110. In such an embodiment, lid 150 and either outer wall 130 or inner wall 140 may be completely or partially threaded such as to allow lid 150 to be secured to vessel 110 by screwing it onto outer wall 130 or onto inner wall 140. Although this disclosure describes and depicts particular ways of coupling lid 150 and vessel 110, this disclosure recognizes that lid 150 may be coupled to vessel 110 in any suitable manner. For example, lid 150 may have a friction fit with vessel 110 such that lid 150 may be held in place by friction with outer wall 130 or inner wall 140 when pressure is applied to a top side of lid 150. As yet another example, lid 150 may be coupled to vessel 110 using a hinge.

Although vessel 110 is depicted as cylindrical in FIGS. 1 and 2, it may be of any suitable shape and size. For example, vessel 110 may be round (e.g., circular, ovular, etc.) in shape and have a diameter large enough to accommodate reservoir 160 and gap 170. As another example, vessel 110 may be square (e.g., rectangular, quadrilateral, etc.) in shape. Vessel 110 may include any suitable material 180 and/or any suitable combination of materials 180. For example, vessel 110 can be composed of one or more of the following materials 180: plastic, metal, wood, and rubber.

Turning now to FIG. 2, FIG. 2 illustrates a top down, cross-section view of system 100a (the section taken along axis 2 of FIG. 1). In this view, thermal sleeve 120 is shown as being positioned between outer wall 130 and inner wall 140. As discussed above in reference to FIG. 1, thermal sleeve 120 may fit snugly (such that thermal sleeve 120 contacts both inner wall 140 and outer wall 130) or loosely within gap 170 (such that thermal sleeve 120 one or none of inner wall 140 and outer wall 130). As was also discussed above in reference to FIG. 1, inner wall 140 may define reservoir 160 which may be configured to contain a food or beverage.

As will be described in further detail herein, systems 100a and 100b of FIGS. 1 and 4, respectively, use a thermal sleeve, such as thermal sleeve 120 illustrated in FIG. 3, to facilitate heat transfer between the contents within reservoir 160 (e.g., food or beverage 101) and thermal sleeve 120. This may have the desirable effect of cooling or heating the contents 101 to a particular temperature (e.g., ambient temperature) faster than it otherwise would if contained within a conventional insulated container (e.g., a thermos).

Figure 3:
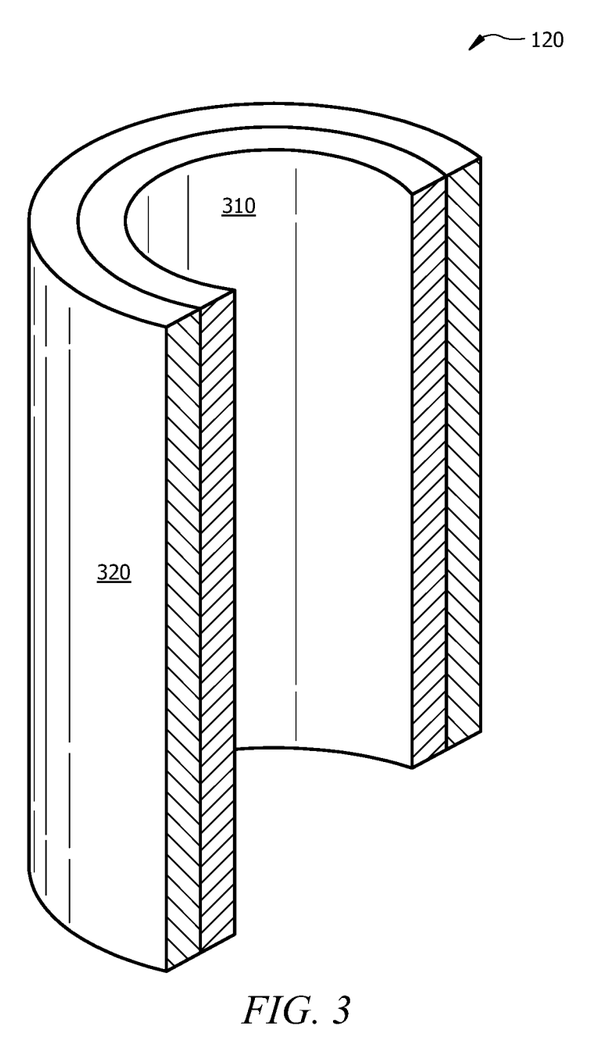
FIG. 3 illustrates a cross section view of the thermal sleeve of FIG. 1, according to certain embodiments of the present disclosure.

FIG. 3 illustrates a cross sectional view of the thermal sleeve 120 of system 100a. Thermal sleeve 120 may be of any suitable size and shape. In some embodiments, thermal sleeve 120 matches or mimics the size and shape formed by gap 170 as delineated by inner wall 140 and outer wall 130. Thermal sleeve 120 may be composed of one or more materials. As depicted, thermal sleeve 120 includes a first material 310 layered by a second material 320. In some embodiments, first material 310 is the same material as second material 320. In other embodiments, first material 310 is a different material than second material 320. Although FIG. 3 depicts thermal sleeve 120 as having two layers, each layer made of a particular material (e.g., first material 310 and second material 320), this disclosure contemplates thermal sleeve 120 having any suitable number of layers or other configurations and comprising any number of materials. For example, rather than being layered as depicted in FIG. 3, second material 320 may completely encapsulate first material 310.

First material 310 may be any suitable material. In some embodiments, first material 310 is selected based on a specific heat capacity of the material. This disclosure recognizes technical benefits of first material 310 being a material (includes any state of matter) having a specific heat capacity above approximately (i.e., +/−10% J g$^{-1}$ K$^{-1}$) 2.0 J g$^{-1}$ K$^{-1}$. TABLE 1 below identifies exemplary materials and their corresponding approximate specific heat capacities.

TABLE 1

| Material | Specific Heat Capacity (J g$^{-1}$ K$^{-1}$) |
| --- | --- |
| paraffin wax | 2.9 |
| balsa wood | 2.9 |
| white pine wood | 2.5 |
| wax | 3.43 |
| beeswax | 3.4 |
| lithium | 3.58 |
| rubber | 2.01 |
| water | 4.17 |

Although this disclosure explicitly identifies particular materials having a specific heat capacity above 2.0 J g$^{-1}$ K$^{-1}$, this disclosure is non-limiting. As will be understood by one of ordinary skill in the art, a plurality of other materials have a specific heat capacity above approximately 2.0 J g$^{-1}$ K$^{-1}$ and thus would provide similar technical benefits if implemented as first material 310. In some other embodiments, first material 310 has a specific heat capacity between approximately (i.e., +/−10% J g$^{-1}$ K$^{-1}$) 0.75 and 2.0 J g$^{-1}$ K$^{-1}$. In still other embodiments, first material 310 has a specific heat capacity below approximately 0.75 J g$^{-1}$ K$^{-1}$. This disclosure specifically recognizes that first material 310 may include or be any of the following: metallic filler, carbon-based filler, ceramic filler, and/or mineral filler.

Second material 320 may also be any suitable material. In some embodiments, second material 310 is selected based on a thermal conductivity of the material. This disclosure recognizes technical benefits of second material 320 having a thermal conductivity above approximately (i.e., +/−10% W/m K) 200 W/m K. TABLE 2 below identifies exemplary materials and their corresponding approximate thermal conductivities.

TABLE 2

| Material | Thermal Conductivity (W/m K) |
| --- | --- |
| copper | 413 |
| silver | 403 |
| gold | 327 |
| silicon | 264 |
| beryllium | 301 |
| diamond | 2000 |
| graphite | 1950 |

Although this disclosure explicitly identifies particular materials having a thermal conductivity above approximately 200 W/m K, this disclosure is non-limiting. As will be understood by one of ordinary skill in the art, a plurality of other materials have a thermal conductivity above approximately 200 W/m K and thus would provide similar technical benefits if implemented as second material 320. In some other embodiments, second material 320 has a thermal conductivity between approximately (i.e., +/−10% W/m K) 100 to 200 W/m K. In still other embodiments, second material 320 has a thermal conductivity below approximately 100 W/m K. This disclosure specifically recognizes that second material 320 may include or be any of the following: aluminum, tin, steel, bronze, iron, nickel, titanium, carbon, and/or ceramic.

In a particular embodiment, thermal sleeve 120 includes two layers, one laid atop the other, wherein the first layer is composed of paraffin wax (e.g., first material 310) and the second layer is composed of copper (e.g., second material 320). In some embodiments, thermal sleeve 120 is positioned within gap 170 such that second material 320 is nearer to inner wall 140 than first material 310 (i.e., second material 320 is proximate to inner wall 140 and first material 310 is distal to inner wall 140). In other embodiments, thermal sleeve 120 is positioned within gap 170 such that first material 310 is nearer to inner wall 140 than second material 320 (i.e., first material 310 is proximate to inner wall 140 and second material 320 is distal to inner wall 140).

FIG. 4 illustrates another embodiment of system 100, identified in FIG. 4 as system 100*a*. Like system 100*a*, system 100*b* is configured to manipulate the heat transfer of a food or beverage contained within reservoir 160. System 100*b* differs from system 100*a* in a number of ways. First, lid 150 includes an aperture 420 therethrough that is sized to accommodate a straw 430. As one of ordinary skill in the art will recognize, straw 430 may be used to extract food and/or beverage 101 from reservoir 160. Second, system 100*b* includes a base 410. As described above, some systems 100 include base 410 in addition to lid 150. Base 410 may be included in system 100 because gap 170 is not accessible by removing lid 150. This particular instance is presented in FIG. 4 and represents another difference between systems 100*a* and 100*b*. Notably, outer wall 130 of system 100*b* extends proximally toward inner wall 140 thereby preventing or restricting top-down access to gap 170 (even when lid 150 is removed). Like lid 150, base 410 is configured to be removably coupled to vessel 110. Removal may be partial or full and coupling may be achieved by any suitable means, such as the means described above in reference to lid 150. As one of ordinary skill in the art will recognize, certain advantages may arise from preventing or restricting access to gap 170 from the top (by removing lid 150). As one example, if vessel walls (e.g., inner wall 140 and/or outer wall 130) restrict or prevent access to gap 170 from the top, food or beverage 101 is restricted or prevented from inadvertently being added to gap 170.

The following is a description of operation for manipulating heat transfer using thermal sleeve 120. As described above, thermal sleeve 120 may be removably installed within vessel 110 in order to heat or cool contents of reservoir 160 to a particular temperature (e.g., ambient temperature) faster than it otherwise would if contained within a conventional insulated container (e.g., a thermos). The vessel 110 is opened in a manner that permits access therethrough to reservoir 160. Stated differently, vessel 110 is opened such as to expose reservoir 160. In some embodiments, opening vessel 110 may include partially or fully removing lid 150 from vessel 110. As described above, lid 150 may be a screw on lid which can be removed from vessel 110 by turning lid 150 in a direction that unthreads seams in lid 150 and vessel 110. As another example, vessel 110 may be opened by unlatching a portion of lid 150 and hinging open lid 150 to reveal access to reservoir 160.

Once opened, food or beverage 101 may be added to reservoir 160. Any suitable amount of food or beverage 101 may be added to reservoir 160. For example, food or beverage 101 may be added to reservoir until reservoir is substantially full (e.g., volume of food or beverage 101 fills 90% or more of reservoir 160). As another example, a minimal volume of food or beverage 101 may be added to reservoir such that reservoir is substantially empty (e.g., less than 10% of reservoir is filled with food or beverage 101). For the avoidance of doubt, any reference herein to "filling" reservoir 160 with food or beverage 101 should be interpreted to mean "adding" food or beverage 101 to reservoir 160. Food or beverage 101 may be any suitable temperature (e.g., 30° F., 60° F., 120° F., 180° F.). Temperature of food or beverage 101 when added to reservoir 160 may or may not be the desired consumption temperature of food or beverage 101. As discussed above, in the event an operator of system 100 determines heat transfer is or will be unnecessary (e.g., when food or beverage 101 is at its desired consumption temperature), gap 170 may be used as an additional reservoir for containing the same or different food or beverage as food or beverage 101.

Upon adding food or beverage 101 to reservoir 160, it may be determined whether food or beverage 101 is at a desired temperature. In some cases, the desired temperature is the desired consumption temperature. In some embodiments, determining whether food or beverage 101 is at a desired temperature involves manually sensing (e.g., tasting or touching) food or beverage 101. In other embodiments, vessel 110 may include a temperature sensor (e.g., thermometer) and a display wherein temperature sensor is configured to sense the temperature of food or beverage 101 within reservoir 160 and output the temperature on the display. Although this disclosure describes particular ways of determining whether food or beverage 101 is at a desired temperature, this disclosure contemplates all suitable means of doing so.

In the event that food or beverage 101 is not at a desired temperature, thermal sleeve 120 may be inserted into gap 170 of vessel 110. As described above, inserting thermal sleeve 120 in gap 170 facilitates heat transfer that results in a change of temperature of food or beverage 101 within reservoir 160. A change in temperature of food or beverage 101 may be desired for any suitable reason. For example, an operator of system 100 may be inclined to cool down coffee that is too hot to drink (e.g., 200° F.). In such scenario, as long as the environment of system 100 is less than the temperature of the coffee (e.g., 200° F.), inserting thermal sleeve 120 in gap 170 will facilitate heat transfer, thereby reducing the temperature of the coffee. As another example, an operator of system 100 may be inclined to cool down water that has become hot over time due to its exposure to the sun. In such scenario, as long as the environment of system 100 is less than the temperature of the water (e.g., 100° F.), inserting thermal sleeve 120 in gap 170 will facilitate heat transfer, thereby reducing the temperature of the water (e.g., to ambient). As discussed above, thermal sleeve 120 may be able to drive a temperature change due at least in part to its material composition. In some embodiments, the change in temperature occurs faster than the change otherwise would in a conventional insulated container. This is due to the vessel 110 having an increased thermal conductivity due to the installation of thermal sleeve 120 within vessel 110. The change in temperature may be computed based on a first temperature, taken when food or beverage 101 is added to reservoir at step 503, and a temperature taken subsequent to installing thermal sleeve 120 within gap 170.

In addition to being installed within gap 170, thermal sleeve 120 may be removed from gap 170. As discussed above, thermal sleeve 120 may be removed from gap 170 via top or bottom access points (e.g., through one or more of lid 150 and base 410). Lid 150 and/or base 410 may be configured to recouple to vessel 110 after thermal sleeve 120 has been removed from gap 170.

In some embodiments, removing thermal sleeve 120 from gap 170 creates a full or partial vacuum. As will be recognized by one of ordinary skill in the art, a vacuum is not thermally conductive and thus is an effective insulator. Creating a vacuum by removing thermal sleeve 120 may be beneficial, for example, once food or beverage 101 has reached a desired temperature and operator of system 100 wants to maintain food or beverage 101 at the desired temperature. As described above, vessel 110 may include one or more features that enable an operator to know when food or beverage 101 has reached a desired temperature. As an example, vessel 110 may include a temperature sensor and an output component configured to display or otherwise notify operator of the temperature sensed by temperature sensor. As another example, vessel 110 may further include one or more input interfaces, a storage device, and/or a processor. Operator may set, using the input interface, a desired temperature setting (e.g., 135° F.) which may be stored in the storage device. Upon adding food or beverage 101 to reservoir 160, temperature sensor may begin to take pressure measurements and communicate such measurements to the processor, which is configured to compare the measurements to the stored setting. Upon receiving a measurement that substantially matches (e.g., +/−3°) the stored setting, the processor may communicate a signal to the output component (e.g., display, speaker) to notify operator that the temperature of food or beverage 101 is at the desired temperature. This notification may prompt operator to remove thermal sleeve 120 from vessel 110 (in some cases creating a vacuum) so that the food or beverage 101 may be consumed at a desired temperature.

This disclosure contemplates creating a full or partial vacuum in any suitable manner. As one non-limiting example, system 100 may include one or more components that facilitate the creation of a full or partial vacuum, thereby creating a pressure differential between the gap 170 and a surrounding medium of system 100 when removing thermal sleeve 120 from gap 170. For example, vessel 110 of system 100 may include a one-way valve 190 (e.g., flapper valve, duckbill valve) configured to open when thermal sleeve 120 is inserted into gap 170 and configured to close when thermal sleeve 120 is removed from gap 170. When closed, such one-way valve 190 may create a fluid seal thereby preserving the pressure within gap 170.

System 100 may additionally include a gasket configured to couple to an edge of thermal sleeve 120. The gasket may have a size and shape suitable to create a fluid seal within gap 170 thereby preventing air from flowing into or out of gap 170. The gasket may be of any suitable thickness. In some embodiments, the gasket is an o-ring. In such an embodiment, the distance between the outer and inner diameter of the o-ring is sufficient to span the distance between inner wall 140 and outer wall 130 of vessel 110.

The gasket may include one or more coupling mechanisms permitting coupling of the gasket to thermal sleeve 120. In some embodiments, the gasket includes a channel configured to receive an edge of thermal sleeve 120 (e.g., a top edge of thermal sleeve 120 if being inserted via the bottom of vessel 110 or a bottom edge of thermal sleeve 120 if being inserted via the top of vessel 110). In other embodiments, gasket and thermal sleeve 120 are coupled using screw thread closures wherein one or more of thermal sleeve 120 and the gasket are threaded such that thermal sleeve 120 couples to gasket when screwed together. Upon the insertion of thermal sleeve 120 into gap 170, the gasket may engage and couple to thermal sleeve 120 (e.g., by receiving, within its channel, an edge of thermal sleeve 120) and, once coupled, movement of thermal sleeve 120 within gap 170 governs the movement of the gasket along the length of gap 170.

Gasket may further be configured to decouple from thermal sleeve 120 prior to passing over or through the one-way valve 190, thereby staying within gap 170 even after thermal sleeve 120 is entirely removed from gap 170. As an example, vessel 110 may include one or more protuberances proximate to the entry point of gap 170. Such protuberances may provide enough flex to allow passage of thermal sleeve 120 into and out of gap 170 but not enough flex to allow passage of the gasket. Accordingly, gasket will remain within gap 170 even after thermal sleeve 120 is removed via the one-way valve 190. As another example, thermal sleeve 120 may become uncoupled from the gasket by unscrewing one component from another. One of ordinary skill in the art will recognize benefits to decoupling the gasket and thermal sleeve 120 proximate to the entry point of gap 170.

Various embodiments may perform some, all, or none of the steps described above. Furthermore, certain embodiments may perform these steps in a different order than that illustrated and/or in parallel with other steps. In certain embodiments, one or more steps of method 500 may be repeated.

Modifications, additions, or omissions may be made to system 100 without departing from the scope of the disclosure. Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A system for manipulating heat transfer, the system comprising:
 a thermal sleeve comprising a paraffin wax layer adjacent a copper layer;
 a vessel comprising a one-way valve and an outer wall disposed about an inner wall, wherein:
  the inner wall defines a reservoir configured to contain a liquid;
  the inner wall and the outer wall define a gap therebetween; and
  the gap is sized to accommodate the thermal sleeve; and
  the one-way valve is disposed in the gap; and
  the one-way valve opens as the thermal sleeve is inserted into the gap and closes, sealing off the gap, as the thermal sleeve is removed from the gap;
 a lid configured to couple to a top portion of the vessel and further configured to open to facilitate adding the liquid to the reservoir, wherein the lid comprises an aperture sized to accommodate a straw therethrough;
 a covering configured to couple to a bottom portion of the vessel and further configured to open to facilitate removal of the thermal sleeve from the gap; and wherein the thermal sleeve and one-way valve are further configured to create at least a partial vacuum when the thermal sleeve is removed from the gap; and wherein the thermal sleeve, when installed within the gap, exchanges heat with the liquid.

2. A system for manipulating heat transfer, the system comprising:
 a thermal sleeve comprising a first material and a second material; and
 a vessel comprising a one-way valve and an outer wall disposed about an inner wall, wherein:
  the inner wall defines a reservoir configured to contain the liquid; and
  the inner wall and the outer wall define a gap therebetween;
  the one-way valve opens as the thermal sleeve is inserted into the gap and closes, sealing off the gap, as the thermal sleeve is removed from the gap; and
 a lid configured to open to facilitate adding of the liquid to the reservoir; and
 wherein:
  the thermal sleeve is further configured to be positioned within the gap; and
  the thermal sleeve and one-way valve are further configured to create at least a partial vacuum when the thermal sleeve is removed from the gap.

3. The system of claim 2, wherein the first material is selected from the group consisting of:
 wax;
 wood;
 lithium;
 rubber; and
 water.

4. The system of claim 2, wherein the second material is selected from the group consisting of:
 copper;
 aluminum;
 tin;
 steel;
 bronze;
 iron;
 nickel;
 silver;
 gold;
 titanium;
 carbon;
 diamond;
 graphite;
 beryllium;
 silicon; and
 ceramic.

5. The system of claim 2, wherein the vessel further comprises at least a third material selected from the group consisting of:
 plastic;
 metal;
 wood; and
 rubber.

6. The system of claim 2, wherein the system further comprises a covering configured to open to facilitate removal of the thermal sleeve from the gap.

7. The system of claim 6, wherein removing the thermal sleeve from the gap creates a pressure differential between the gap and a surrounding medium.

8. The system of claim 6, wherein the covering is the lid.

9. The system of claim 2, further comprising a gasket configured to create a fluid seal within the gap.

10. The system of claim 2, wherein the lid further comprises an aperture sized to accommodate a straw therethrough.

11. The system of claim 2, wherein the first material has a specific heat capacity greater than approximately 2.00 J $g^{-1} K^{-1}$.

12. The system of claim 2, wherein the second material has a thermal conductivity greater than approximately 200 W/m K.

13. A thermal sleeve configured to exchange heat with a liquid, the thermal sleeve comprising:
 at least a first layer and a second layer, wherein:
  the first layer is adjacent to the second layer; and
  the first layer comprises a first material;
  the second layer comprises a second material; and
 wherein:
  the thermal sleeve has a size and shape configured to fit within a gap of a vessel, the gap being defined by an inner wall and an outer wall of the vessel;
  the first layer of the thermal sleeve contacts the inner wall of the vessel when the thermal sleeve is installed within the gap of the vessel; and
  the thermal sleeve is further configured to interact with a one-way valve to open the one-way valve as the thermal sleeve is inserted into the gap and close the one-way valve as the thermal sleeve is removed from the gap, the removal of the thermal sleeve creating at least a partial vacuum in the gap.

14. The thermal sleeve of claim 13, wherein the first material has a specific heat capacity greater than approximately 2.00 J $g^{-1} K^{-1}$.

15. The thermal sleeve of claim 13, wherein the second material has a thermal conductivity greater than approximately 200 W/m K.

16. The thermal sleeve of claim 13, wherein the first material is selected from the group consisting of:
 wax;
 wood;
 lithium;
 rubber;
 water;
 metallic filler;
 carbon-based filler;
 ceramic filler; and
 mineral filler.

17. The thermal sleeve of claim 13, wherein the second material is selected from the group consisting of:
 copper;
 aluminum;
 tin;
 steel;
 bronze;
 iron;
 nickel;
 silver;
 gold;
 titanium;
 carbon;
 diamond;
 graphite;
 beryllium;
 silicon; and
 ceramic.

18. The thermal sleeve of claim 13, further comprising an edge configured to be received by a channel of a gasket.

19. The system of claim 2, wherein the one-way valve is a duckbill valve.

20. The system of claim 2, wherein the one-way valve is a flapper valve.

\* \* \* \* \*